United States Patent [19]

Bertling et al.

[11] Patent Number: 5,580,150
[45] Date of Patent: Dec. 3, 1996

[54] VEHICLE HEADLAMP

[75] Inventors: Johannes Bertling, Vaihingen; Hans Daumueller, Bodelshausen; Karl-Otto Dobler, Reutlingen; Juergen Mueller, Albstadt; Lothar Streit, Sonnenbuehl; Albert Vent, Eningen, all of Germany

[73] Assignee: Robert Bosch GmbH, Stuttgart, Germany

[21] Appl. No.: 549,561

[22] Filed: Nov. 27, 1995

[30] Foreign Application Priority Data

Oct. 27, 1994 [DE] Germany ............ 44 38 328.2

[51] Int. Cl.⁶ .................................... B60Q 1/06
[52] U.S. Cl. .......................... 362/66; 362/289
[58] Field of Search ................... 362/66, 289

[56] References Cited

U.S. PATENT DOCUMENTS 4,967,319 10/1990 Seko ........................... 362/66
5,453,914 9/1995 Dobler ......................... 362/66

FOREIGN PATENT DOCUMENTS 8713631 10/1987 Germany.

*Primary Examiner*—Carroll B. Dority
*Attorney, Agent, or Firm*—Michael J. Striker

[57] ABSTRACT

The headlamp has a headlamp insert (10), which is mounted pivotably at its front marginal region (22) in a receiving fixture (12). A part (50) of the receiving fixture (12) has an opening (52) through which there is placed from above an adjusting screw (54), which is supported by its head (55) against the top side of the receiving fixture part (50), which is screwed into a threaded bore (43) in the headlamp insert (10) and onto which there is screwed, between the headlamp insert (10) and the receiving fixture part (50), a female part (57). The female part (57) enables the adjusting screw (54) and hence the headlamp insert (10) to be fixed to the receiving fixture part (50) and, once the female part (57) is loosened, the adjusting screw (54) can be twisted in order to adjust the alignment of the optical axis (28) of the headlamp insert (10) in a vertical longitudinal plane.

25 Claims, 4 Drawing Sheets

VEHICLE HEADLAMP

PRIOR ART

The invention derives from a vehicle headlamp of the generic type of claim 1.

A headlamp of this kind is known by virtue of German Utility Model 87 13 631. This headlamp has a headlamp insert comprising a reflector and a cover plate attached thereto. The headlamp insert is held pivotably on a receiving fixture in the form of a supporting frame. The headlamp insert is mounted in the manner of a three-point bearing on the supporting frame and can be pivoted in order to adjust the alignment of its optical axis in a vertical longitudinal plane and in order to adjust the alignment of its optical axis in a horizontal longitudinal plane. The bearing points of the headlamp insert are formed by ball journals and ball joint bearings. For an adjustment of the inclination and for an adjustment of the horizontal alignment of the optical axis of the headlamp insert, an adjusting device is provided having adjusting screws which are configured at their one ends as the ball journals and have at their other ends a threaded shaft by which they are screwed into a respective female part attached to the supporting frame. The adjusting screws are herein disposed with their longitudinal axes roughly horizontal and parallel to the optical axis of the headlamp insert and, in order to be actuated, have to be accessible from the rear side of the headlamp, where the space available in the vehicle is often very cramped. Especially where the adjusting screws are disposed in the lower region of the receiving fixture, it becomes difficult to reach them. For the adjustment of the alignment of the optical axis of the headlamp insert in the vertical and in the horizontal direction, the adjusting device requires in each case a separate adjusting screw, so that a large number of structural parts are needed in total, thereby also resulting in very complex assembly, which ought to be avoided in mass production.

ADVANTAGES OF THE INVENTION

The headlamp according to the invention, having the features according to the independent claims 1 and 2, has the advantage in contrast to the above that the adjusting device can be actuated from the top side of the headlamp and is simply configured.

Advantageous designs and refinements of the invention are defined in the contingent claims. The configuration according to claim 4 additionally allows adjustment of the alignment of the optical axis of the headlamp insert in a horizontal longitudinal plane, without the need for an additional screw bolt or additional adjusting screw. The configuration according to claim 5 serves to ensure that, even where the screw bolt or adjusting screw is tilted on the receiving fixture part, a planar contact bearing of the female parts or screw head exists, thereby enabling the screw bolt or adjusting screw to be securely fixed. The configuration according to claim 7 allows the adjustment of the alignment of the optical axis of the headlamp insert in the horizontal longitudinal plane to be checked. The configuration according to claim 9 enables a particularly simple pivotable mounting of the headlamp insert in the receiving fixture. The configuration according to claim 14 serves to ensure that the headlamp insert cannot be twisted when the alignment of the optical axis in a horizontal longitudinal plane is adjusted.

DRAWING

Three illustrative embodiments of the invention are explained in greater detail in the following description and represented in the drawing, in which.

DESCRIPTION OF THE ILLUSTRATIVE EMBODIMENT

A vehicle headlamp, especially for motor vehicles, represented in FIGS. 1 to 9 has a headlamp insert 10, which is disposed in a receiving fixture 12. The receiving fixture 12 is part of the bodywork of the vehicle, but can also be a supporting frame connected to the bodywork or a housing connected to the bodywork. The receiving fixture 12 has a light-radiating opening 13, which is sealed with a light-transmitting cover plate 14. The cover plate 14 can be configured as a smooth plate or can be provided with optically active elements. The headlamp insert 10 comprises a reflector 16, a light source 17 inserted in the latter, a tubular carrier part 18, which is connected to the front rim 21, pointing in the light-radiating direction 20, of the reflector 16, a lens 23 disposed on the front rim 22, pointing in the light-radiating direction 20, of the carrier part 18, and a diaphragm 25 disposed within the carrier part 18 in the region of the front rim 21 of the reflector 16. The headlamp insert 10 is a so-called "projection headlamp insert". The headlamp insert can also however be configured as a reflexion system and then merely comprises the reflector, to whose front rim there is attached, where appropriate, a cover plate, the light source inserted in the reflector and, where appropriate, a supporting frame accommodating the reflector.

Figure 4:
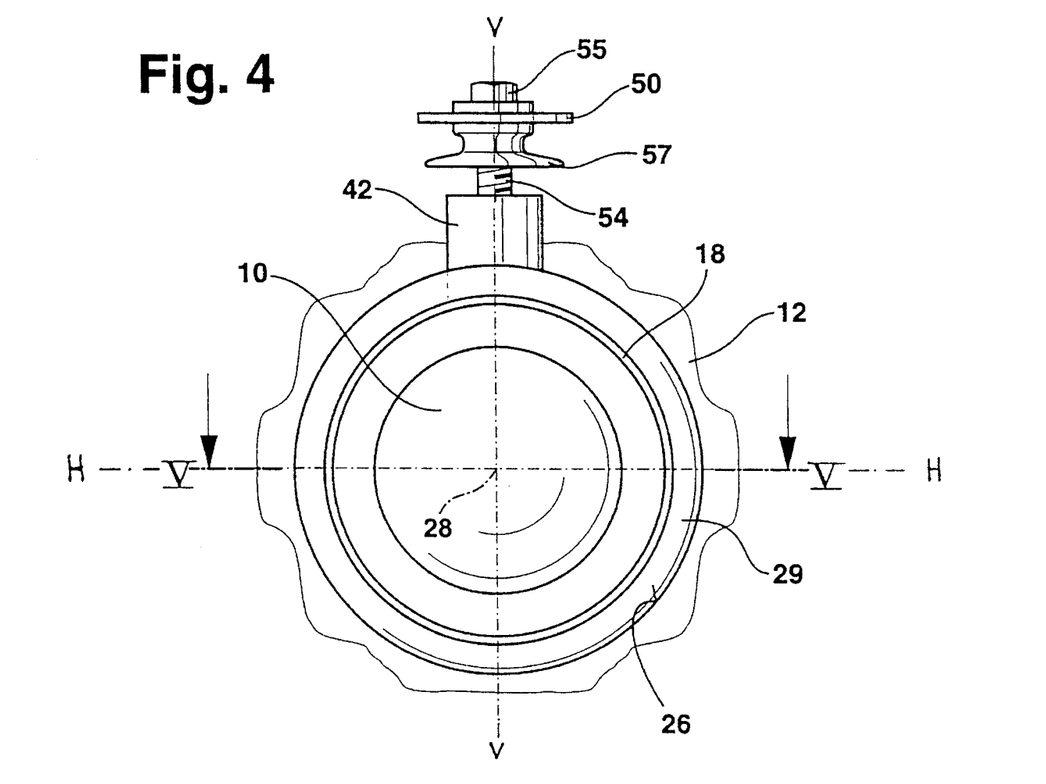
FIG. 4 shows the headlamp in a cross section along the line IV—IV in FIG. 1.

The headlamp insert 10 is mounted in its front region pointing in the light-radiating direction 20, i.e. in the region of the front rim 22 of the carrier part 18, pivotably in the receiving fixture 12, at least in a vertical longitudinal plane VV. If the headlamp insert is configured as a reflexion system, then it is mounted pivotably in the region of the front rim of the reflector. Preferably, the headlamp insert 10 is mounted such that it is spatially pivotable, i.e. such that it can additionally be pivoted in a horizontal longitudinal plane HH. The carrier part 18 is disposed, at least in the region of its front rim 22, in a portion 26 of the receiving fixture 12 and is surrounded on its periphery by said receiving fixture portion. In the represented illustrative embodiments, the carrier part 18 and the receiving fixture portion 26 are of rounded, for example circular or oval, configuration in the cross section perpendicular to the optical axis 28 of the headlamp insert 10, as is represented in FIG. 4. The cross-sectional shape of the carrier part 18 and of the receiving fixture portion 26 can also be differently configured, for example rectangularly, a swivel motion of the carrier part 18 in the receiving fixture portion 26, at least in the vertical longitudinal plane and, where appropriate, also in the horizontal longitudinal plane HH, being nevertheless possible. The receiving fixture portion 26 is generally matched in its cross-sectional shape to the cross-sectional shape of the carrier part 18. Clamped between the outer periphery of the carrier part 18 and the inner periphery of the receiving fixture portion 26 there is an elastic element 29, so that the carrier part 18 is accommodated in a play-free manner in the receiving fixture portion 26. The elastic element 29 is configured as a sealing ring, which surrounds the carrier part 18 over the whole of its periphery. The front rim 22 of the carrier part 18 has, in the light-radiating direction 20, a region of reduced diameter, so that on the periphery of the carrier part 18 there is formed a step 30 pointing in the light-radiating direction 20. Supported against this step 30, counter to the light-radiating direction 20, is the sealing ring 29. The carrier part 18 can also be provided in its periphery, in the region of its front rim 22, with a circumferential annular groove, in which the sealing ring 29 is disposed. As a result of the sealing ring 29, dirt and moisture is prevented from penetrating into that region of the receiving fixture 12 in which the headlamp insert 10 is disposed.

The receiving fixture portion 26 is disposed, counter to the light-radiating direction 20, remote from the light-radiating opening 13 of the receiving fixture 12 and is configured, in the cross section perpendicular to the optical axis 28, smaller than the light-radiating opening 13. The receiving fixture portion 26 is configured in one piece with the receiving fixture 12 and is connected by walls 31 to the front rim of the receiving fixture 12, which front rim surrounds the light-radiating opening 13. In the installation position of the headlamp in the vehicle, the receiving fixture portion 26 is offset toward the lower rim of the receiving fixture 12, there being configured above the receiving fixture portion 26 a roughly vertically extending wall 32 of the receiving fixture 12, by which the region lying behind it is concealed, so that this region cannot be seen from outside the headlamp. The receiving fixture portion 26 is configured roughly in the shape of a hollow cylinder and points with its free end 34 counter to the light-radiating direction 20. The free end 34 of the receiving fixture portion 26 widens counter to the light-radiating direction 20, the widening being able to be realized, for example, conically. The headlamp insert 10 is thus accommodated pivotably in the receiving fixture portion 26 and can be pivoted in any chosen direction as the element 29 is elastically deformed.

Figure 9:
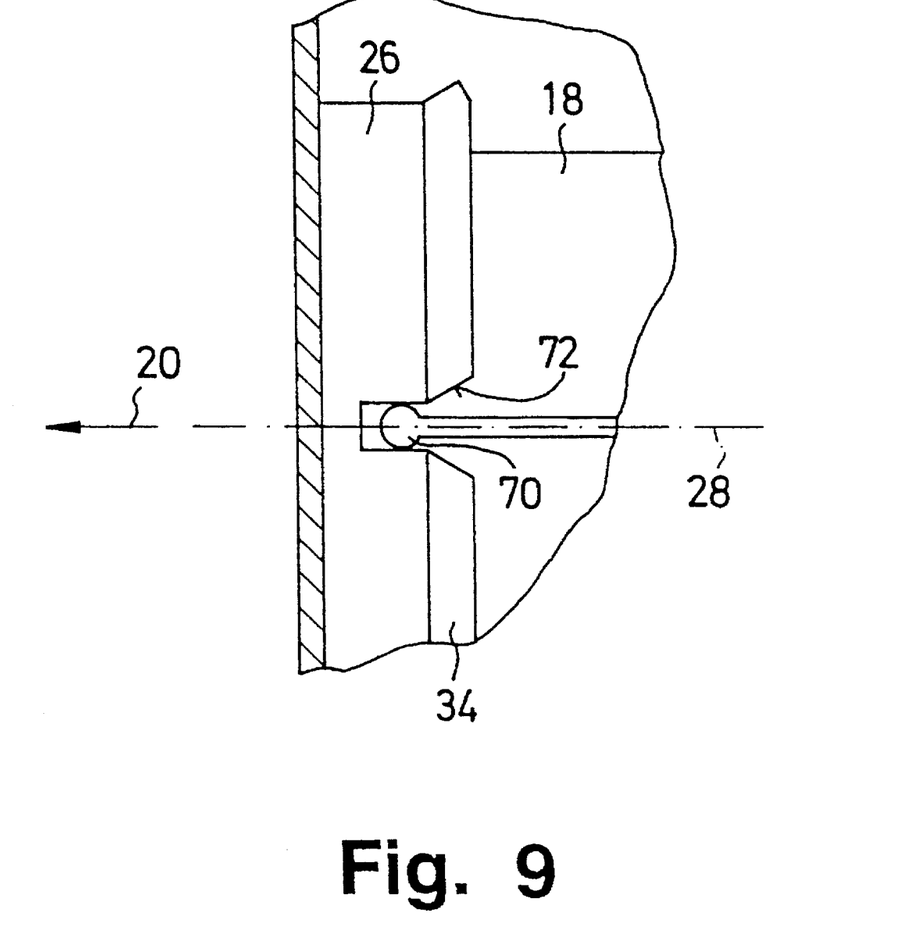
FIG. 9 shows the headlamp, in extract form, in a section along the line IX—IX in FIG. 1.

The headlamp insert 10 is secured in the receiving fixture portion 26 against twisting about the optical axis 28. The anti-twist securement is achieved, as represented in FIG. 9, by a projection 70 which protrudes upward from the carrier part 18 and engages, with minor play in the tangential direction relative to the optical axis 28, in a recess 72 in the free end 34 of the receiving fixture portion 26, which recess extends parallel to the optical axis 28. The projection 70 is displaceable in the recess 72 in the direction of the optical axis 28 so as not to prevent the headlamp insert 10 from being pivoted in order to adjust the alignment of the optical axis 28 in the vertical longitudinal plane VV. That end of the projection 70 which is disposed in the recess 72 is spherically configured and the recess 72 is widened in its marginal region counter to the light-radiating direction 20 to enable the headlamp insert 10 to be pivoted so as to adjust the alignment of the optical axis 28 in the horizontal longitudinal plane HH. The arrangement of the projection 70 and recess 72 can also be inverted, so that the projection is disposed on the receiving fixture portion 26 and the recess on the carrier part. Finally, the projection 70 and the recess 72 can also be disposed at any other chosen points on the periphery of the receiving fixture portion 26 and on that of the carrier part 18.

Figure 2:
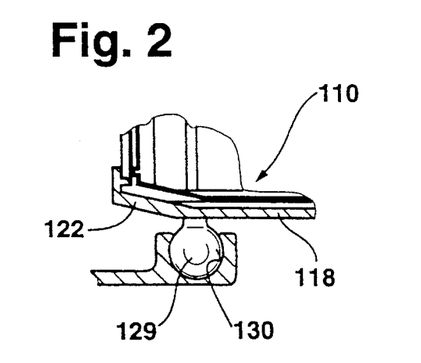
FIG. 2 shows the headlamp in extract form, having a modified mounting.

In FIG. 2, the headlamp is represented in extract form, having a modified mounting. The headlamp insert 110 is constructed essentially the same as the above-described headlamp insert 10. The carrier part 118 of the headlamp insert 110 has in the region of its front rim 122 a downwardly protruding ball journal 129, which is accommodated pivotably in a ball journal holder 130 of the receiving fixture. In this embodiment of the headlamp also, the headlamp insert 110 is disposed in the receiving fixture such that it is spatially pivotable. At the same time, the headlamp insert 110 is likewise secured against twisting about the optical axis 28.

Figure 1:
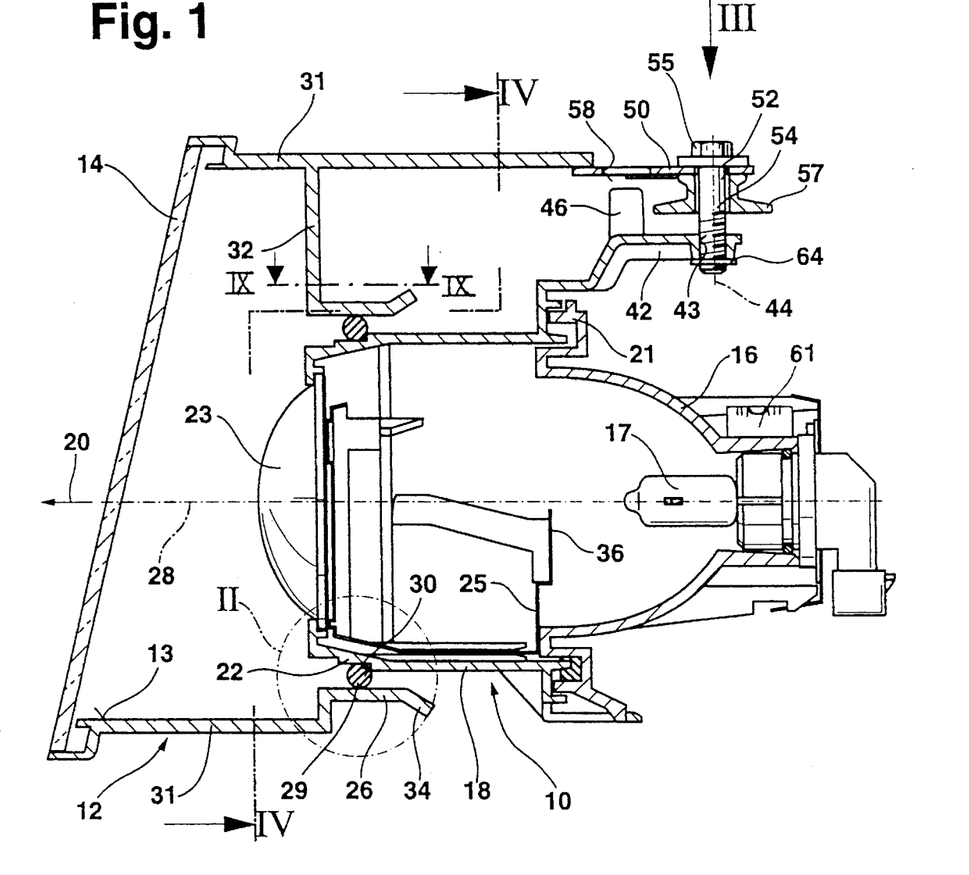
FIG. 1 shows a vehicle headlamp having a receiving fixture and an adjusting device for said headlamp, according to a first illustrative embodiment, in a vertical longitudinal section.
Figure 5:
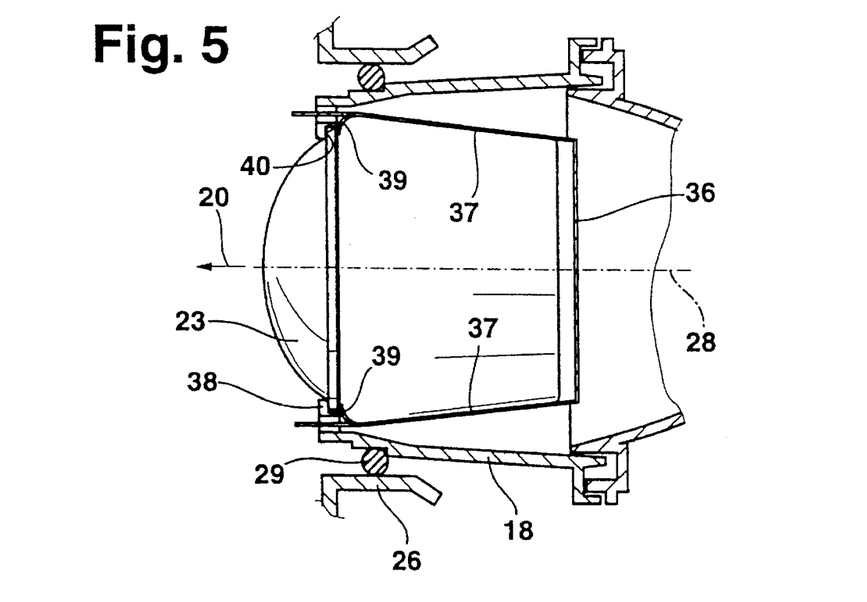
FIG. 5 shows the headlamp, in extract form, in a horizontal longitudinal section along the line V—V in FIG. 4.

The carrier part 18 of the headlamp insert 10 according to FIG. 1 is fixedly connected to the front rim 21 of the reflector 16, for example bonded or latch-locked. The diaphragm 25 is fastened in the carrier part 18 and its actual diaphragm portion 36 is disposed roughly in the plane of the front rim 21 of the reflector 16. The diaphragm portion 36 extends perpendicular to the optical axis 28 and substantially beneath this and forms, when the headlamp is in use, an upper light-dark boundary of the light beam radiating from the headlamp. As represented in FIG. 5, the diaphragm 25 additionally has two arms 37, which protrude from the diaphragm portion 36 in the light-radiating direction 20 and the ends of which jut through a respective opening in the front end wall 38 of the carrier part 18, which front end wall surrounds the lens 23. Within the carrier part 18, in front of the lens 23 on each arm 37, a hook 39 is respectively bent radially inward over the rim of the lens 23, which hooks hold the lens 23 in bearing contact against a step 40 on the front rim 22 of the end wall 38 of the carrier part 18.

In a first illustrative embodiment of an adjusting device of the headlamp, represented in FIGS. 1 to 4, in the region of the front rim 21 of the reflector 16 there protrudes upward from the carrier part 18, in the installation position of the headlamp on the vehicle, an arm 42, which extends at a distance from the reflector 16 counter to the light-radiating direction 20 and has in the region of its free end a, for instance, threaded bore 43, the axis 44 of which runs at least approximately perpendicular to the optical axis 28 and in the vertical direction. The axis 44 of the threaded bore 43 lies in a vertical longitudinal plane VV of the headlamp insert 10, which longitudinal plane is marked in FIG. 4 and contains the optical axis 28. The carrier part 18 preferably consists of synthetic material, the arm 42 being configured in one piece with the latter. The carrier part 18 can also however consist of sheet metal and the arm 42 can be configured as a separate part connected to the carrier part 18. The arm 42 can additionally, where appropriate, have a boss 46, which protrudes upwardly from it and the function of which will be further explained below.

The upper wall 31 of the receiving fixture 12 extends counter to the light-radiating direction 20 over the headlamp insert 10 to close to the free end of the arm 42 of the carrier part 18. To the wall 31 there is fixedly connected a plate-shaped part 50, which thus forms part of the receiving fixture 12 and constitutes an extension of the wall 31. The plate 50 is disposed above the arm 42 of the carrier part 18 and, viewed in the horizontal direction, extends over only part of the width of the wall 31 in the region of the arm 42. The plate 50 is fastened to the wall 31, for example, by means of one or more screws 51, and extends at least approximately perpendicular to the optical axis 28 and horizontally. The plate 50 can consist, for example, of synthetic material and has an opening 52, which is preferably configured as a long hole, the longitudinal extent of which runs in the horizontal direction and at least approximately perpendicular to the optical axis 28. The long hole 52 can be of straight or curved configuration, having the center of curvature in the front marginal region 22 of the headlamp insert 10. Through the long hole 52 there is placed, from the top side of the headlamp, i.e. in the arrow direction III in FIG. 1, an adjusting screw 54, which is supported by its head 55 against the top side of the plate 50 at the rim close to the long hole 52 and whose longitudinal axis, which is identical with the longitudinal axis 44 of the threaded bore 43, runs at least approximately vertically and perpendicular to the optical axis 28. The adjusting screw 54 is screwed in the threaded bore 43 of the arm 42, a female part 57 being screwed on the adjusting screw 54 in the region between the arm 42 and plate 50, which female part is rotatable on the adjusting screw 54. The end of the adjusting screw 54 juts out of the arm 42 on the bottom side and has an annular groove in which a securing ring 64 is clamped. The female part 57 has a diameter such that it can be acted upon beneath the plate 50 from diagonally above, thereby enabling it to be twisted from the top side or from the rear side of the headlamp. The plate 50 can also be configured in one piece with the upper wall 31 of the receiving fixture 12, the long hole 52 in this case then being configured directly in the end region of the wall 31.

Figure 3:
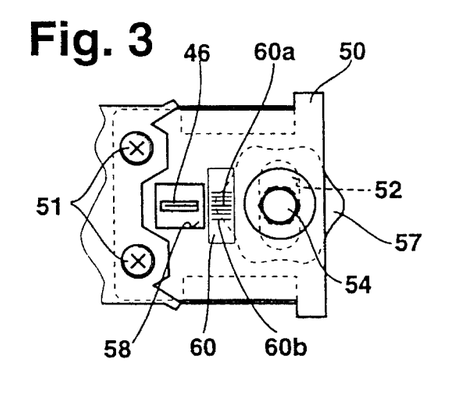
FIG. 3 shows the headlamp in extract form, in a view in the arrow direction III in FIG. 1.

The plate 50 can additionally, where appropriate, have a further opening 58, through which the boss 46 of the arm 42 juts or, as represented in FIG. 3, is at least visible when viewed from the top side of the headlamp in the arrow direction III in FIG. 1. The further opening 58, like the long hole 52, is of elongated configuration and runs with its longitudinal extent roughly parallel to that of the long hole 52. Along the longitudinal extent of the opening 58 there is disposed on its rim a scale 60, with which the boss 46 interacts as a marking.

The fitting of the headlamp and the adjustment of the headlamp insert 10 is described below. The headlamp insert 10 is pre-fitted as a complete unit and the sealing ring 29 is slid onto the front rim 22 of the carrier part 18. The headlamp insert 10 is inserted into the receiving fixture portion 26 from the rear side of the receiving fixture 12 in the light-radiating direction 20, which is easily possible as a result of the widening of the free end region of the receiving fixture portion 26. The projection 70 is hereupon introduced into the recess 72. The adjusting screw 54 is passed from above through the long hole 52 in the plate 50 and from below the female part 57 is screwed onto the adjusting screw 54. Then the adjusting screw 54 is screwed into the threaded bore 43 in the arm 42 of the carrier part 18 and the securing ring 64 is inserted into the annular groove. If the female part 57 on the adjusting screw 54 is screwed far enough upward that it comes to bear against the bottom side of the plate 50 and is firmly tightened, then the adjusting screw 54 is fixed to the plate 50 so that it is neither displaceable in the direction of its longitudinal axis 44 nor twistable about its longitudinal axis 44. In this case, the headlamp insert 10 is fixed in the receiving fixture 12.

For an adjustment of the headlamp insert 10, i.e. of the alignment of its optical axis 28, the female part 57 is loosened. For an adjustment of the alignment of the optical axis 28 in the vertical longitudinal plane VV, i.e. of the inclination of the optical axis 28, the adjusting screw 54, once the female part 57 is loosened, is twisted, whereby, depending upon the direction of rotation, the headlamp insert 10 is moved vertically upward or downward in the region of its arm 42 by virtue of the threaded connection to the adjusting screw 54. The adjusting screw 54 is herein located with its head 55 in bearing contact against the top side of the plate 50, this having been brought about by the weight of the headlamp insert 10. The securing ring 64 serves to ensure that the adjusting screw 54 cannot be rotated completely out of the threaded bore 43 of the arm 42. The headlamp insert 10, when the adjusting screw 54 is twisted, performs a swivel motion about its front marginal region, which is mounted without play in the receiving fixture portion 26 by means of the elastic element 29, so that the inclination of the optical axis 28 in the vertical longitudinal plane VV is adjusted. The projection 70 is herein displaced in the recess 72. The elastic element 29 is herein able to counterbalance changes in distance which, upon the swivel motion of the headlamp insert 10, arise between the front rim 22 of the carrier part 18 and the receiving fixture portion 26. If the inclination of the optical axis 28 is correctly adjusted, then the female part 57 is re-tightened firmly to the plate 50, so that the headlamp insert 10 is fixed. If the adjusting screw 54, when the alignment of the optical axis 28 in the vertical longitudinal plane VV is correctly adjusted, does not run perpendicular to the plate 50, the plate 50, as it is slightly elastically deformed, is able to adapt to this tilt, so that a planar bearing contact of the head 55 of the adjusting screw 54 and the female part 57 against the plate 50, and hence a secure fixation of the adjusting screw 54, is nevertheless made possible. In order to check the adjustment of the inclination of the optical axis 28, it is possible to connect to the headlamp insert, in a known manner, a water level 61, which is visible from outside the receiving fixture 12 and which indicates the deviation of the actual inclination setting from a predefined correct inclination setting. If, for the headlamp insert 10, only one adjusting option for the alignment of the optical axis 28 in the vertical longitudinal plane VV is necessary, then the opening 52 in the plate 50 does not need to be configured as a long hole, but is configured in its diameter such that the adjusting screw 54 passes through it with minor play.

Once the female part 57 is loosened, the alignment of the optical axis 28 in the horizontal longitudinal plane HH can additionally be adjusted by the adjusting screw 54 being displaced in the long hole 52 in the direction of its longitudinal extent. The headlamp insert 10 is also herein moved in the region of its arm 42 in the horizontal direction and pivoted about its front marginal region disposed in the receiving fixture portion 26. At the same time, the projection 70 is likewise pivoted in the recess 72, which is made possible by its spherical configuration. The checking of the alignment of the optical axis 28 in the horizontal longitudinal plane HH is taken care of by the boss 46 of the arm 42, which is visible from above through the opening 58 in the plate 50 and interacts with the scale 60 on the rim of the opening 58. The scale 60 has a particularly prominent scale marking 60a, to which the boss 46 points when the alignment of the optical axis 28 is correctly adjusted, and a plurality of further scale markings 60b, which indicate a deviation in the alignment of the optical axis 28 from the correct alignment.

The above-described configuration of the headlamp enables the alignment of the optical axis 28 to be adjusted from the top side of the headlamp. In addition, with the single adjusting screw 54, an adjustment of the alignment of the optical axis 28 of the headlamp insert 10 both in the vertical longitudinal plane and in the horizontal longitudinal plane is made possible. Both adjustments are herein possible independently from each other, i.e. when the alignment of the optical axis 28 in the vertical longitudinal plane is adjusted by twisting of the adjusting screw 54, the alignment in the horizontal longitudinal plane remains unaltered, and conversely, when the alignment of the optical axis 28 in the horizontal longitudinal plane is adjusted by displacement of the adjusting screw 54, the alignment in the vertical longitudinal plane remains unaltered.

Figure 6:
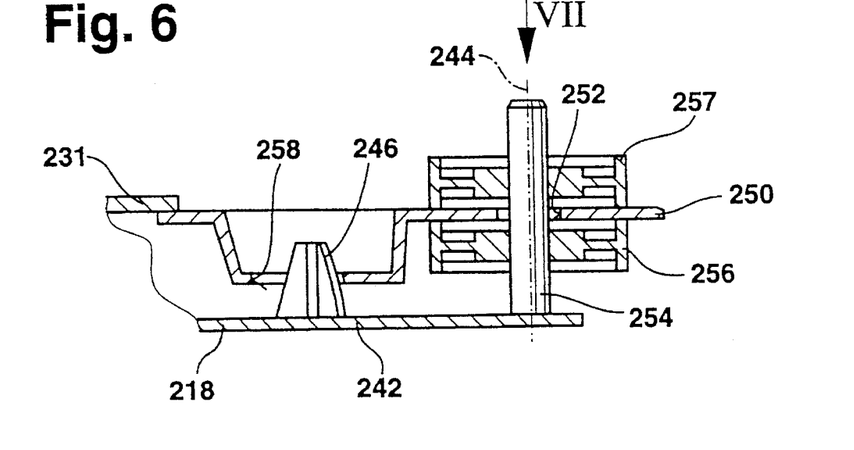
FIG. 6 shows selected portions of the headlamp having the adjusting device according to a second illustrative embodiment in a longitudinal section.
Figure 7:
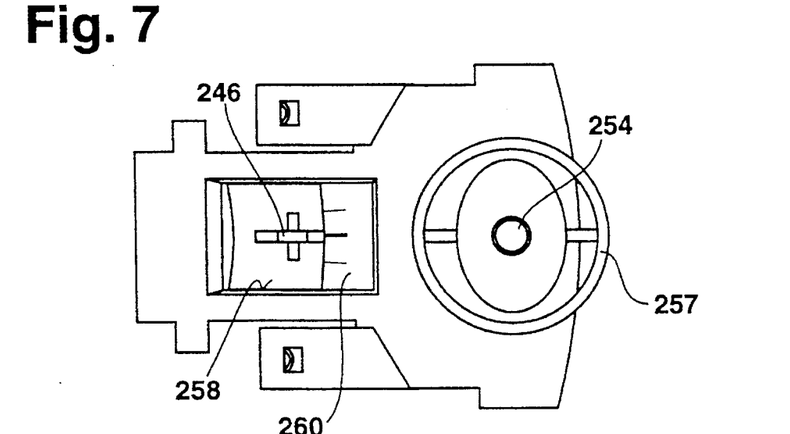
FIG. 7 shows selected portions of the headlamp in a view in the arrow direction VII in FIG. 6.

FIGS. 6 and 7 illustrate a second illustrative embodiment of the adjusting device of the headlamp. The receiving fixture and the headlamp insert are in this case essentially configured as in the first illustrative embodiment. Protruding upward from the carrier part 218 is the arm 242, to which there is fixedly connected an upwardly protruding screw bolt 254, the longitudinal axis 244 of which runs at least approximately vertically. Protruding upward from the arm 242, moreover, is the boss 246. To the upper wall 231 of the receiving fixture there is fixedly connected the plate-shaped part 250, which has the opening 252 in the form of a long hole which is disposed with its longitudinal extent at least approximately perpendicular to the optical axis 28 and in horizontal arrangement. If only one adjusting option for the alignment of the optical axis 28 in the vertical longitudinal plane VV is necessary for the headlamp, then the opening 252 is configured in its diameter to a size just large enough to allow the screw bolt 254 to pass through it with minor play. The plate 250 additionally has the further opening 258, which, like the long hole 252, is of elongated configuration and on the rim of which there is disposed the scale 60. The screw bolt 254 juts upward through the long hole 252 and onto it there is screwed, between the arm 242 and the plate 250, a first female part 256 and onto its portion jutting through the long hole 252 there is screwed, from above, a second female part 257.

The fitting and functioning with respect to the adjusting device according to the second illustrative embodiment is described below. As in the first illustrative embodiment, the headlamp insert is pre-fitted and inserted into the receiving fixture portion 26. Onto the screw bolt 254 there is screwed the first female part 256, the screw bolt 254 is passed through the long hole 252 and onto it is screwed the second female part 257. Provoked by the weight of the headlamp insert, the second female part 257 is drawn downward into bearing contact against the top side of the plate 250, so that the alignment of the optical axis 28 of the headlamp insert in the vertical longitudinal plane is determined by the arrangement of the second female part 257. The first female part 256 is used to clamp the screw bolt 254 to the plate 250.

In order to adjust the alignment of the optical axis 28 in the vertical longitudinal plane, the second female part 257 is loosened, so that the headlamp insert is moved vertically downward in the region of its arm 242 and the downward inclination of the optical axis 28 thereby reduced. Should the downward inclination of the optical axis 28 be increased, then the first female part 256 too must additionally be loosened and the second female part 257 can then be rotated downward on the screw bolt 254. If the alignment of the optical axis 28 in the vertical longitudinal plane is correctly adjusted, then the first female part 256 is re-tightened firmly to the plate 250, so that the screw bolt 254 is clamped to the plate 250 and the headlamp insert is fixed. For the adjustment of the alignment of the optical axis 28 in the horizontal longitudinal plane, only the first female part 256 is loosened, thereby enabling displacement of the screw bolt 254 in the long hole 252. Once the adjustment is completed, the first female part 256 is re-tightened firmly to the plate 250, so that the screw bolt 254 is fixed. In the case, also, of the adjusting device according to the second illustrative embodiment, the adjustments of the alignment of the optical axis 28 in the vertical longitudinal plane and in the horizontal longitudinal plane are able to be made without the one influencing the other.

Figure 8:
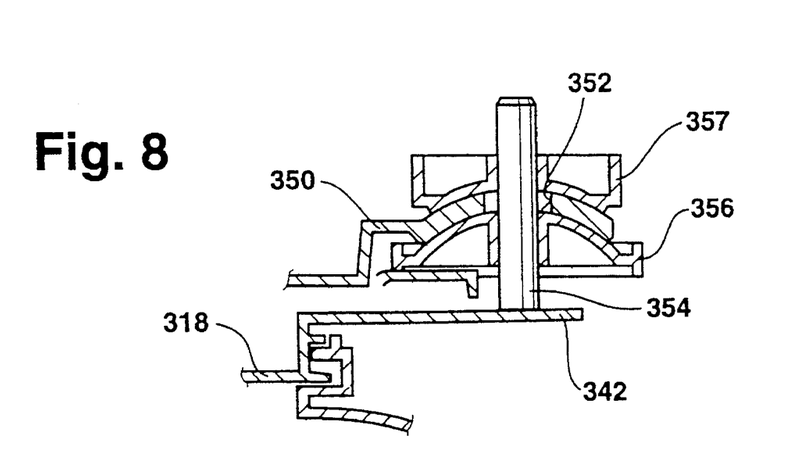
FIG. 8 shows selected portions of the headlamp having the adjusting device according to a third illustrative embodiment in a longitudinal section.

FIG. 8 illustrates a third illustrative embodiment of the adjusting device, in which this is configured essentially the same as in the second illustrative embodiment. To the arm 342 of the carrier part 318 there is fixedly connected the screw bolt 354, onto which, between the arm 342 and the plate 350, there is screwed the first female part 356 and onto whose portion jutting through the long hole 352 in the plate 350 there is screwed the second female part 357. The plate 350, in its region surrounding the long hole 352, is configured such that it is bowed at least approximately spherically, the bowing being convexly upward on its top side and concavely upward on its bottom side. The plate 350 can also be configured such that it is concavely bowed on its top side and convexly bowed on its bottom side or convexly bowed on both sides or concavely bowed on both sides. The two female parts 356 and 357 are likewise correspondingly bowed on their sides entering into bearing contact against the plate 350, so that a planar contact is obtained between the respective female part 356 and 357 and the plate 350. This configuration of the plate 350 and of the female parts 356, 357 serves to ensure that a planar contact is always obtained, even if the screw bolt 354, given appropriate alignment of the optical axis 28 in the vertical longitudinal plane, does not pass perpendicular to the plate 350 through the long hole 352, but is inclined at an angle. The fitting and the functioning of the adjusting device according to the third illustrative embodiment is the same as described above with respect to the second illustrative embodiment. The bowed configuration of the plate and of the female part can also be envisaged in the configuration of the adjusting device according to the first illustrative embodiment, where the plate 50, in the region of the opening 52, and the contact faces of the screw head 55 and of the female part 57 are accordingly then bowed in their configuration.

We claim:

1. A vehicle headlamp, comprising a headlamp insert with at least one reflector; a receiving fixture on which said headlamp insert is held pivotably; an adjusting device for pivoting said headlamp insert in order to adjust an alignment of an optical axis of said headlamp at least in a vertical longitudinal plane, said adjusting device including a screw bolt passing through an opening in a part of said receiving fixture and fixable to said part; at least one first female part by which said screw bolt is fixable to said part, said screw bolt being fixedly connected to said headlamp insert and protruding upwards from said headlamp insert, said first female part being screwed onto said screw bolt between said headlamp insert and said part of said receiving fixture; a second female part screwed onto a portion of said screw bolt which juts upwards through said opening in said part of said receiving fixture, said both female parts for a fixation of said screw bolt being bringable into bearing contact against said part of said receiving fixture so that one of said female parts is loosened, rotation of the other of said female parts allows said headlamp insert to be pivoted in order to adjust the alignment of the optical axis in the vertical longitudinal plane.

2. A vehicle headlamp as defined in claim 1, wherein said opening in said part of said receiving fixture is elongated in a horizontal direction running at least approximately perpendicular to the optical axis, said screw bolt, once said at least one female part is loosened, is displaceable in order to adjust the alignment of the optical axis in a horizontal longitudinal plane.

3. A vehicle headlamp as defined in claim 1, wherein said part of said receiving fixture in the region in which said female parts entering into the bearing contact is bowed configuration, said female parts on their sides entering into the bearing contact against said part of said receiving fixture being configurated such that they are bowed in opposite directions.

4. A vehicle headlamp as defined in claim 1, wherein said part of said receiving fixture is a separate part which is fixedly connected to said receiving fixture.

5. A vehicle headlamp as defined in claim 1, wherein said part of said receiving fixture has a further opening which extends at least substantially parallel to said first mentioned opening and has a rim provided with a scale, said headlamp insert having a marking which is visible through said further opening and interacts with said scale to indicate a deviation of the adjustment of the alignment of the optical axis of said headlamp insert from a predetermined desired setting.

6. A vehicle headlamp as defined in claim 1, wherein said headlamp insert at its front marginal region pointing in a light radiating direction is pivotally mounted, said screw bolt being disposed from said front marginal region of said headlamp insert counter to the light radiation direction.

7. A vehicle headlamp as defined in claim 1, wherein said receiving fixture has a portion which surrounds said headlamp in said at least on a part of its periphery, said headlamp insert being mounted pivotally in said portion of said receiving fixture; and further comprising at least one elastically deformable element which is clamped between said headlamp insert and said portion of said receiving fixture and which mounts pivotally said headlamp insert in said portion of said receiving fixture.

8. A vehicle headlamp as defined in claim 7, wherein said portion of said receiving fixture surrounds said headlamp insert over the whole of its periphery, said elastically deformable element being formed as a ring which surrounds said headlamp insert in a region of said portion of said receiving fixture over the whole of its periphery.

9. A vehicle headlamp as defined in claim 7, wherein said portion of said receiving fixture is formed substantially in a shape of a hollow cylinder with a longitudinal extent running at least substantially parallel to the optical axis of said headlamp insert, said portion of said receiving fixture having a cross-sectional shape which is matched to a cross-sectional shape of said headlamp insert.

10. A vehicle headlamp as defined in claim 7, wherein said portion of said receiving fixture is formed by a plurality of stays which are scattered over a periphery of said headlamp insert, said elastically deformable element being clamped between said stays and an outer periphery of said headlamp insert.

11. A vehicle headlamp as defined in claim 7, wherein said headlamp insert, in addition to said reflector, has a lens which is disposed remote from said reflector in a light-radiating direction; and further comprising a carrier part connected to said reflector and holding said lens, said headlamp being located with said carrier part in said portion of said receiving fixture, said at least one elastically deformable element being clamped between said carrier part and said portion of said receiving fixture.

12. A vehicle headlamp as defined in claim 1, wherein said headlamp insert is secured against twisting about the optical axis; and further comprising means for securing said headlamp insert against twisting about the optical axis.

13. A vehicle headlamp, comprising a headlamp insert having at least one reflector; a receiving fixture which pivotally holds said headlamp insert; an adjusting device for pivoting said headlamp insert in order to adjust an alignment of an optical axis of said headlamp insert at least in a vertical longitudinal plane, said adjusting device including an adjusting screw which passes through an opening in a part of said receiving fixture and is fixable to said part; at least one female part which fixes said adjusting screw to said part of said receiving fixture, said adjusting screw in an installation position of the headlamp passing from above through said opening in said part of said receiving fixture and having a head supported against the top side of said part of said receiving fixture, said headlamp insert having a threaded bore in which said adjusting screw is screwed by a lower end of said adjusting screw, said female part being screwed onto said adjusting screw between said headlamp insert and said part of said receiving fixture, said female part for a fixation of said adjusting screw being bringable into bearing contact against a bottom side of said part of said receiving fixture, so that when said female part is loosened said adjusting screw is twistable in order to adjust the alignment of the optical axis in the vertical longitudinal plane.

14. A vehicle headlamp as defined in claim 13, wherein said lower end of said adjusting screw juts through a threaded bore and has a detachable securing element preventing said adjusting screw from being fully rotated out of said threaded bore.

15. A vehicle headlamp as defined in claim 13, wherein said opening in said part of said receiving fixture is elongated in a horizontal direction running at least approximately perpendicular to the optical axis, said adjusting screw, once said at least one female part is loosened, is displaceable in order to adjust the alignment of the optical axis in a horizontal longitudinal plane.

16. A vehicle headlamp as defined in claim 13, wherein said part of said receiving fixture in the region in which a head of said adjusting screw and said female parts entering into the bearing contact is bowed configuration, said head of said adjusting screw and said female parts on their sides entering into the bearing contact against said part of said receiving fixture being configurated such that they are bowed in opposite directions.

17. A vehicle headlamp as defined in claim 13, wherein said part of said receiving fixture is a separate part which is fixedly connected to said receiving fixture.

18. A vehicle headlamp as defined in claim 13, wherein said part of said receiving fixture has a further opening which extends at least substantially parallel to said first mentioned opening and has a rim provided with a scale, said headlamp insert having a marking which is visible through said further opening and interacts with said scale to indicate a deviation of the adjustment of the alignment of the optical axis of said headlamp insert from a predetermined desired setting.

19. A vehicle headlamp as defined in claim 13, wherein said headlamp insert at its front marginal region pointing in a light radiating direction is pivotally mounted, said adjusting screw being disposed from said front marginal region of said headlamp insert counter to the light radiation direction.

20. A vehicle headlamp as defined in claim 13, wherein said receiving fixture has a portion which surrounds said headlamp in said at least on a part of its periphery, said headlamp insert being mounted pivotally in said portion of said receiving fixture; and further comprising at least one elastically deformable element which is clamped between said headlamp insert and said portion of said receiving fixture and which mounts pivotally said headlamp insert in said portion of said receiving fixture.

21. A vehicle headlamp as defined in claim 20, wherein said portion of said receiving fixture surrounds said headlamp insert over the whole of its periphery, said elastically deformable element being formed as a ring which surrounds said headlamp insert in a region of said portion of said receiving fixture over the whole of its periphery.

22. A vehicle headlamp as defined in claim 20, wherein said portion of said receiving fixture is formed substantially in a shape of a hollow cylinder with a longitudinal extent running at least substantially parallel to the optical axis of said headlamp insert, said portion of said receiving fixture having a cross-sectional shape which is matched to a cross-sectional shape of said headlamp insert.

23. A vehicle headlamp as defined in claim 20, wherein said portion of said receiving fixture is formed by a plurality of stays which are scattered over a periphery of said headlamp insert, said elastically deformable element being clamped between said stays and an outer periphery of said headlamp insert.

24. A vehicle headlamp as defined in claim 20, wherein said headlamp insert, in addition to said reflector, has a lens which is disposed remote from said reflector in a light-radiating direction; and further comprising a carrier part connected to said reflector and holding said lens, said headlamp being located with said carrier part in said portion of said receiving fixture, said at least one elastically deformable element being clamped between said carrier part and said portion of said receiving fixture.

25. A vehicle headlamp as defined in claim 13, wherein said headlamp insert is secured against twisting about the optical axis; and further comprising means for securing said headlamp insert against twisting about the optical axis.

\* \* \* \* \*